May 6, 1958 C. KOSTKA 2,833,026
ALL PURPOSE TOOL ELEMENT HOLDER
Filed Nov. 13, 1953 2 Sheets-Sheet 1
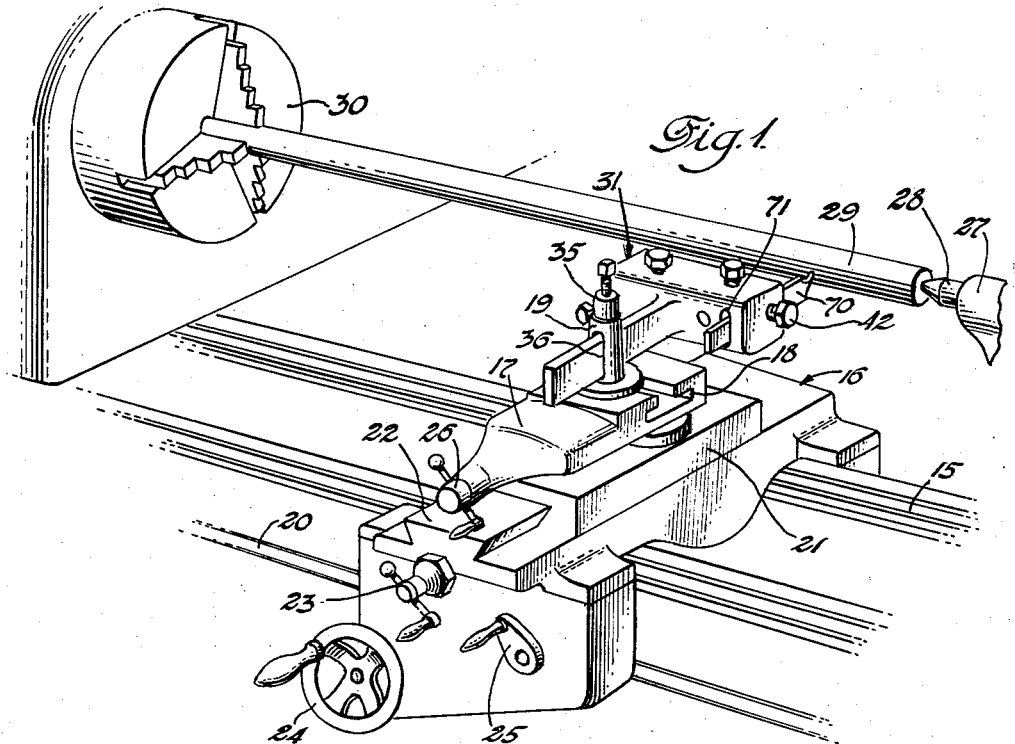
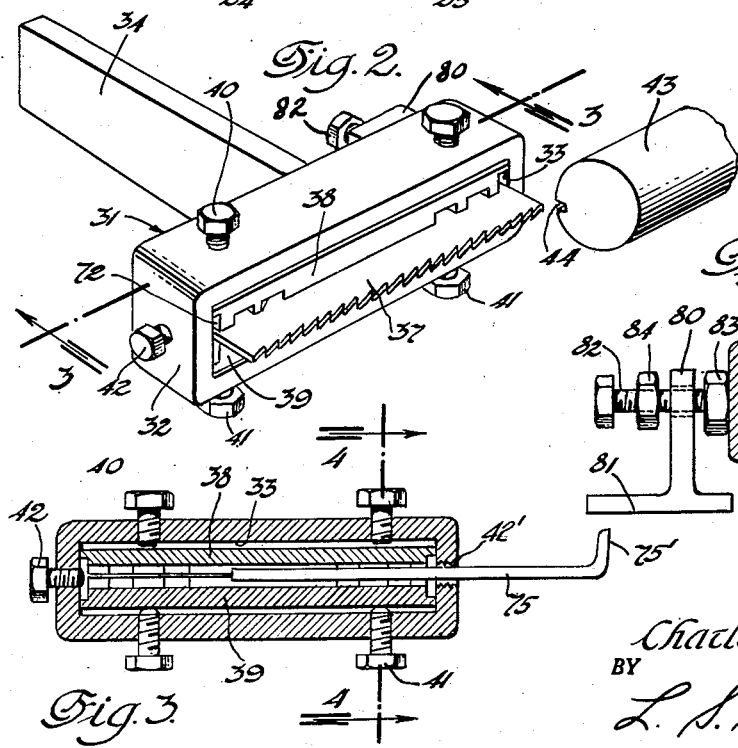
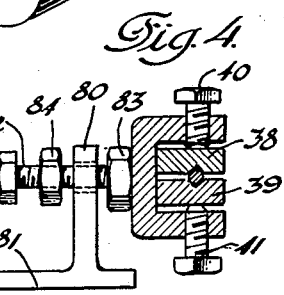
INVENTOR.
Charles Kostka
BY
L. S. Sandebury
ATTORNEY May 6, 1958     C. KOSTKA     2,833,026
ALL PURPOSE TOOL ELEMENT HOLDER
Filed Nov. 13, 1953     2 Sheets-Sheet 2
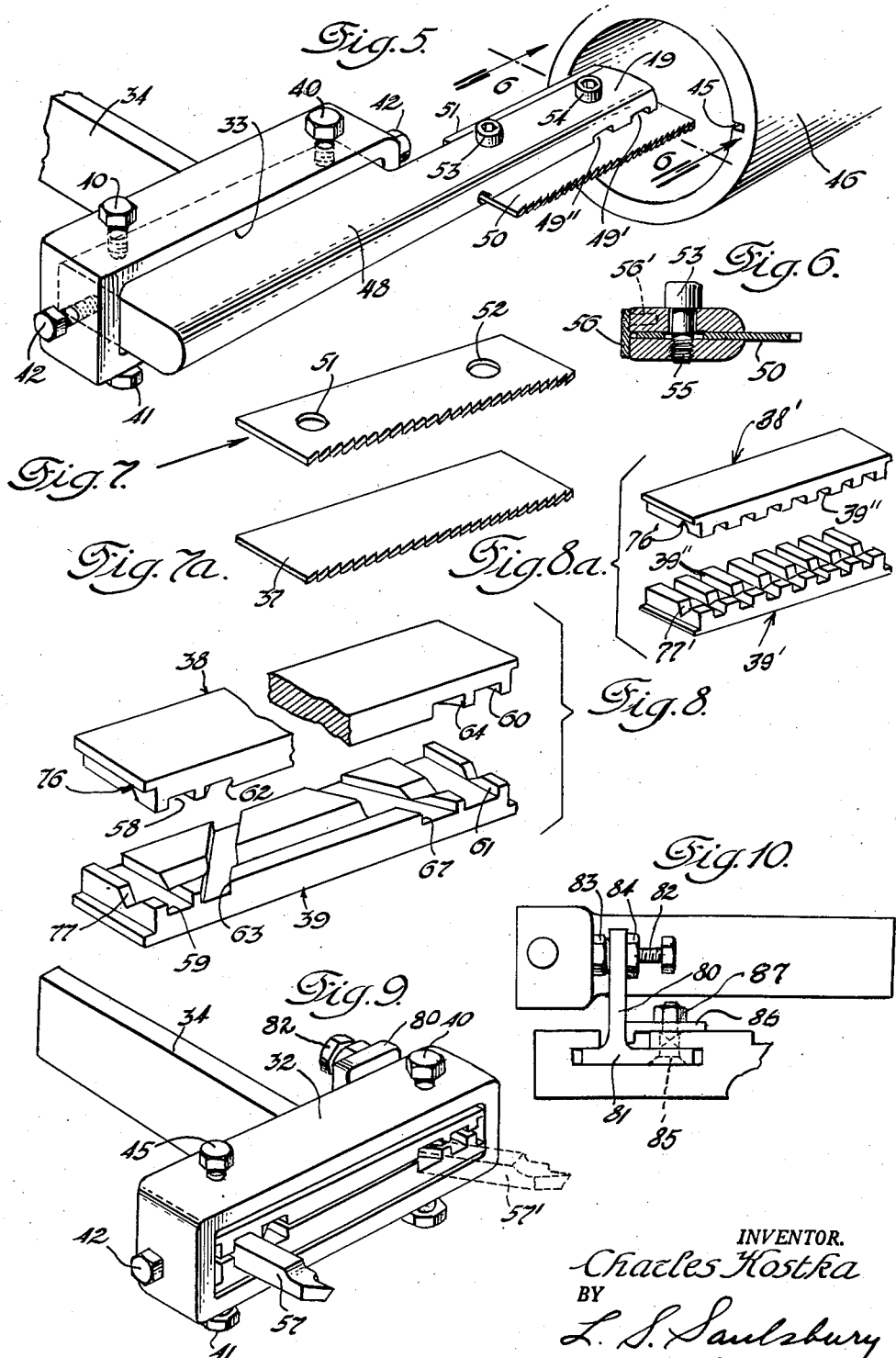
INVENTOR.
Charles Kostka
BY
L. S. Saulsbury
Attorney.

United States Patent Office 2,833,026
Patented May 6, 1958

2,833,026

ALL PURPOSE TOOL ELEMENT HOLDER

Charles Kostka, Bronx, N. Y.

Application November 13, 1953, Serial No. 391,785

3 Claims. (Cl. 29—96)

This invention relates to an all purpose tool element holder for metal lathes.

It is an object of the present invention to provide a tool element holder wherein a cutting tool or bit can be retained at different angles within the holder so as to effect different types of cuts upon the work piece.

It is another object of the invention to provide a tool element holder which has two opposing tool bit holding blocks that are grooves or slotted to receive a tool bit so that it may be positioned for either straight or right and left angle cuts.

It is another object of the invention to provide a tool element holder which has two opposing bit retaining blocks that have cooperating parallel grooves adapted to contain a plurality of cutting bits at one time whereby plural cuts and undercuts may be made at the same time.

It is still another object of the invention to provide a tool element holder which has two opposing retaining blocks that have cooperating transverse grooves adapted to retain a tool bit for internal boring, and wherein the transverse grooves are transverse of the longitudinally extending tool bit grooves.

It is still another object of the invention to provide a cut off tool bit holder which has opposing tool bit retaining blocks that have their ends recessed to receive a cut off bit that projects through the rear of the holder housing and is mountable on either end thereof.

It is a further object of the invention to provide a tool element holder adapted to retain a piece of hack saw blade so that a keyway or slot can be easily and quickly broached in a work piece and wherein an adapter is provided in addition to the holder so a hack saw blade can be retained for internal broaching and as well adapted to hold a tool bit for internal cutting or boring.

It is a still further object of the invention to provide a tool element holder having an elongated box-like formation for receiving adaptors and cutting tool elements on which there is provided a T-bracket member adapted to fit the T-slot of the tool carriage and thereby to firmly brace and support the cutting tool holder against twisting movement in the tool post especially while effecting a broaching operation.

Other objects of the invention are to provide a tool element holder of the all purpose type which is of simple construction, has a minimum number of parts, inexpensive to manufacture, easily and quickly and rigidly assembled with the different cutting elements, adapted for both external and internal broaching and cutting or slotting, durable, adapted to be heavily loaded, convenient to use and efficient in operation.

For other objects and a better understanding of the invention, reference may be had to the following detailed description taken in connection with the accompanying drawing, in which:

Figure 1 is a perspective view of a tool carriage mounted for adjustment on a lathe bed and with the all purpose tool holder embodying the features of the present invention connected to the tool post of the carriage and having its tool element engaging with the work piece;

Fig. 2 is a perspective view of the tool element holder with a saw blade fragment fixed therein;

Fig. 3 is a transverse sectional view of the holder as viewed on line 3—3 of Fig. 2;

Fig. 4 is a vertical sectional view of the holder as viewed on line 4—4 of Fig. 3;

Fig. 5 is a fragmentary perspective view of the holder with an adaptor mounted therein and having an extension for securement thereto of a fragment of a saw blade and the blade aligned for broaching an internal keyway slot;

Fig. 6 is a transverse sectional view taken on line 6—6 of Fig. 5;

Fig. 7 is a perspective view of the saw blade used in the internal extension member of Fig. 5 and having holes therein;

Fig. 7a is a perspective view of the saw blade fixed between the blocks for external broaching, as in Fig. 2;

Fig. 8 is a collective and perspective view of the opposing blocks used within the holder housing to secure the cutting elements and blades;

Fig. 8a is a collective and perspective view of an opposing block for holding tool bits in such a manner as to make multiple cuts;

Fig. 9 is a perspective view of the tool element holder set up for use with a tool bit, the same being extended from the opposing retaining block and with illustration made by which a tool bit is extended at an angle;

Fig. 10 is an end elevational view of the cutting tool holder and the T-bracket member adapted to fit the T-slot of the tool carriage and clamp plate means for fixing the T-bracket to the carriage.

Referring now to the figures, 15 represents a lathe bed having a movable tool carriage 16. On the carriage 16 is a compound rest 17 having a T-slot 18 in which a tool post 19 is fitted and secured. The carriage is operated in the usual manner by a driving shaft 20. The compound rest 17 is mounted on a block 21 that is adjustable over a guideway 22 by turning a handcrank 23. A hand feed wheel 24 can be adjusted to operate the carriage by hand along the lathe bed. A lock 25 secures the carriage to the shaft 20 for automatic feeding. A clamping lever 26 fixes the tool post 19 in the T-slot in the conventional manner. On the one end of the lathe is a tail stock 27 having a center pin 28 to which a work piece 29 is connected. The work piece 29 extends from a driving chuck 30 to be driven by the same.

According to the present invention, there has been provided for the lathe, an all purpose tool element holder 31 adapted to be secured to the tool post in the usual manner. This tool holder 31 comprises an elongated housing 32 having an elongated front opening 33 into which blocks or adaptors are inserted to hold the different tool elements. The housing 32 has an attaching or shank portion 34 adapted to fit the tool post 19 in the same manner that the conventional tool elements are secured. The tool post has a top set screw 35 for engagement with the upper edge of the attaching or shank portion 34 to secure the same in slot 36 of the tool post.

While the opening 33 is adapted for securement of a hack saw blade fragment 37 or a cutting bit, there are provided retaining blocks 38 and 39, Fig. 2. These blocks are made of such thickness as to accommodate the blade 37 therebetween. On the top and bottom of the housing are set screws 40 and 41. These set screws and the blocks 38 and 39 are brought into clamping relationship with the sides of the blade 37. The blocks 38 and 39 are supported on the set screws and can be adjusted up or down to center the tool element upon the work. In the opposite ends of the housing 32 are respectively set screws 42 that engage the ends of the blocks 38 and 39 and the blade 37 to hold a cut off blade rigidly in place as shown in Fig. 1, and in a manner to be later described. With the assembly formed in the manner as thus described and as shown in Fig. 2, a keyway slot may be broached in a work piece 43 as indicated at 44. In broaching this slot 44, the carriage 13 will preferably be power driven across the lathe bed. While broaching by power, a tail end stock vise is used to retain the work piece in a rigid manner, such a vise is shown in a copending application Serial No. 392,137, filed simultaneously herewith.

Referring now particularly to Figs. 5 and 6, there is shown the tool holder extension adapted for broaching or cutting an internal keyway slot 45 in a tubular work piece 46. The opposing members 38 and 39 are removed from the housing 32 and an extension member 48 is snugly fitted into the opening 33 as shown in Fig. 5. The set screws 40, 41 and 42 are tightened to make the extension member 48 secure therewithin. The extension member 48 has a slotted end portion 49 in which a blade 50 is inserted. The blade used with this extension is shown in Fig. 7 and has holes 51 and 52 through which clamping screws 53 and 54 extend for engagement respectively with threaded holes 55 in the lower part of slotted end portion 49. By operation of the carriage the blade 50 can be moved in and out of the end of the tubular for work piece 46 to broach or cut the keyway slot 45 therein. A back plate 56 holds the blade 50 against rearward displacement from the slotted end portion 49 during heavy broaching operations. This plate 56 is secured to the slotted end portion 49 by two countersunk screws 56'. In order to effect internal cutting or boring, tool bit receiving grooves, 49' and 49" are provided in the slotted end portion 49, one groove extending transversely of the end portion and the other groove extending diagonally thereacross.

Referring now particularly to Figs. 8 and 9, there is shown the retaining blocks adapted for receiving cutting bits 57. Retaining blocks 38 and 39 have opposing transverse slots 58, 59 and 60, 61 for receiving and retaining the cutting bit 57 normal to the end face of the tool holder housing 32. Upon the assembly being placed in the opening 33 and the set screws 40 and 41 tightened the cutting bit 57 will rigidly be held in place upon the holder housing 32. The retaining blocks 38 and 39 also respectively have opposing diagonal slots 62, 63 and 64, 65 for holding the cutting bit on at different angles with respect to the end face of the tool holder housing 32 in the manner as indicated at 57'. In Fig. 8a, blocks 38' and 39' are respectively provided with plural slots 38" and 39" for receiving plural tool bits whereby multiple cuts may be simultaneously made. These blocks also respectively have V-shaped grooves 76' and 77'. A cut off tool bit 70, as shown in Fig. 1, may be connected to the housing 32 by extending through a vertical slot 71 on one end of the housing and made secure by the end screw 42. By tightening the set screws 40, 41 and 42, these blocks are centralized and they are secured together to provide an end opening 72 and to hold the blade against the ends of the opposing members 38 and 39, thereby to fix the blade against outward displacement therefrom. A short cut off tool bit can be secured in the end recess of the blocks at the opposite side of the housing.

Referring now to Figs. 3 and 4, an external cutting tool element 75 is secured between the blocks 38 and 39. Members 38 and 39 are provided with V-shaped grooves 76 and 77 respectively which cooperate with one another to hold the tool element 75. The tool element 75 is inserted in a threaded opening 42' which normally receives one of the end screws 42 and upon the upper and lower set screws 40 and 41 being tightened the tool element 75 will be secured rigidly between the blocks 38 and 39. The tool element 75 has a cutting point 75' adapted to make an internal cutting operation in a hollow work member.

In order that the holder will be properly braced against turning movement within the tool post and to provide additional support therefor, a depending T-bracket 80 having horizontal portion 81 is adjustably fixed to the rear of the tool holder housing 32 by a bolt 82 and lock nuts 83 and 84. The horizontal portion 81 depends sufficiently to enter the T-slot 18 so that upon the tool post being fixed in the T-slot 18, the support 80 will likewise be fixed and retained therein. Within the horizontal portion 81 is an upstanding screw bolt 85 on which a clamp plate 86 is placed and tightened down by a nut 87 on the bolt 85. In this manner the holder will be rigidly retained upon the compound rest and be adapted to carry on heavy broaching operations without turning or twisting in the tool post.

It should be apparent that there has been provided a tool holder adapted to support different types of tool cutting elements and that the elements are rigidly secured within the holder to effect a broaching or cutting operation. It will be apparent that this holder is connected to the conventional tool post in the usual manner and by a special vertical support it is rigidly held against turning or twisting movement upon the rest. For the making of grooves the broaching operation is effected with the saw blades and the finishing operations will be effected with the tool bits.

While various changes may be made in the detail construction, it shall be understood that such changes shall be within the spirit and scope of the present invention as defined by the appended claims.

What is claimed is:

1. A tool element holder having an elongated housing portion having an elongated horizontal opening, a shank portion extending rearwardly from the housing and adapted to secure the holder to a tool post, an extension member comprising a base portion of generally rectangular cross section adapted to enter the elongated horizontal opening and be retained in said housing, vertical and horizontal set screw means on said housing engageable with said base portion of the extension member to hold the same in place within the housing, a bifurcated extending portion extending from the base portion and adapted to receive a cutting tool member for effecting an external cutting operation upon internal surface of a hollow member, and set screw means for fixing said bifurcated portion against a tool member.

2. A lathe tool holder assembly comprising an elongated transversely-extending housing having a back wall, top, bottom and end portions and an elongated front opening extending from one end of the housing to the other, a shank extending rearwardly from the back wall portion to the housing and adapted to be secured to a tool post of the lathe, opposing elongated cutting bit retaining blocks extending transversely through the housing and between the end portions, said cutting bit retaining blocks having opposing cutting bit retaining grooves running at an angle with respect to the open end face of the housing, said bit retaining blocks being of less height than the height of the opening in the housing whereby cutting bits can be either secured between the opposing faces of the blocks or within the grooves and between the blocks, said retaining blocks further having opposing longitudinally-extending recesses in the ends thereof adapted to receive a cutting bit so that it may extend outwardly from the open end of the housing, said housing having opposing threaded openings in the top and bottom portions and in the end portions, set screws operable in said threaded openings in the top and bottom portions to secure cutting bits between and within the grooves of the retaining blocks and other set screws in the threaded openings in the end portions engageable with cutting bits disposed in the recesses at the ends of the blocks, whereby cutting bits can be held either between the blocks separate from the grooves, within the grooves between the blocks or in the end recesses of the blocks.

3. A lathe tool holder assembly as defined in claim 2, and transversely-extending opposing grooves extending throughout the transverse width of the retaining blocks and axially aligned with the threaded openings in the end portions whereby upon removal of one of the set screws from a threaded opening in one of the end portions a cutting bit may be extended through the threaded opening and into the transversely-extending grooves to be retained thereby upon the top and bottom set screws being tightened upon the retaining blocks.

References Cited in the file of this patent

UNITED STATES PATENTS

| | | |
|---|---|---|
| 550,671 | Zeunert | Dec. 3, 1895 |
| 790,479 | Carr | May 23, 1905 |
| 861,768 | Remsberg | July 30, 1907 |
| 908,804 | Rhoades | Jan. 5, 1909 |
| 963,746 | Colton | July 12, 1910 |
| 1,303,205 | Johnson | May 6, 1919 |
| 1,307,633 | Midgley | June 24, 1919 |
| 1,575,314 | Bousquet | Mar. 2, 1926 |
| 1,677,143 | Lange | July 17, 1928 |
| 2,247,721 | Wright | July 1, 1941 |
| 2,358,230 | Jacobs | Sept. 12, 1944 |
| 2,363,160 | Sundstrom | Nov. 21, 1944 |
| 2,466,596 | Krause | Apr. 5, 1949 |
| 2,668,467 | Paine | Feb. 9, 1954 |